L. D. SMITH.
HEATING APPLIANCE.
APPLICATION FILED NOV. 8, 1915.

1,179,340.

Patented Apr. 11, 1916.
2 SHEETS—SHEET 1.

INVENTOR
Luther D. Smith,
By Owen, Owen & Crampton,
His attys.

UNITED STATES PATENT OFFICE.

LUTHER D. SMITH, OF TOLEDO, OHIO, ASSIGNOR TO THE STANDARD ELECTRIC STOVE COMPANY, OF TOLEDO, OHIO, A CORPORATION OF OHIO.

HEATING APPLIANCE.

1,179,340.   Specification of Letters Patent.   Patented Apr. 11, 1916.

Application filed November 8, 1915. Serial No. 60,349.

*To all whom it may concern:*

Be it known that I, LUTHER D. SMITH, a citizen of the United States, and a resident of Toledo, in the county of Lucas and State of Ohio, have invented a certain new and useful Heating Appliance; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to cooking appliances, and particularly to a heating attachment for ranges, but is not restricted to such use as it may be used in any connection for which it may be adapted or appropriate.

The primary object of my invention is the provision, in combination with the oven of a range, of a cooker or heating compartment carried by the oven door and inclosing within the oven when the door is closed.

A further object of my invention is the provision of means which is automatically operable, upon a closing of the oven door, to close an electric circuit with the heating element or elements carried within the cooker.

Further objects and advantages of the invention will be apparent from the following detailed description.

While the invention, in its broader aspect, is capable of embodiment in numerous forms, a preferred embodiment thereof is illustrated in the accompanying drawings, in which—

Figure 1:
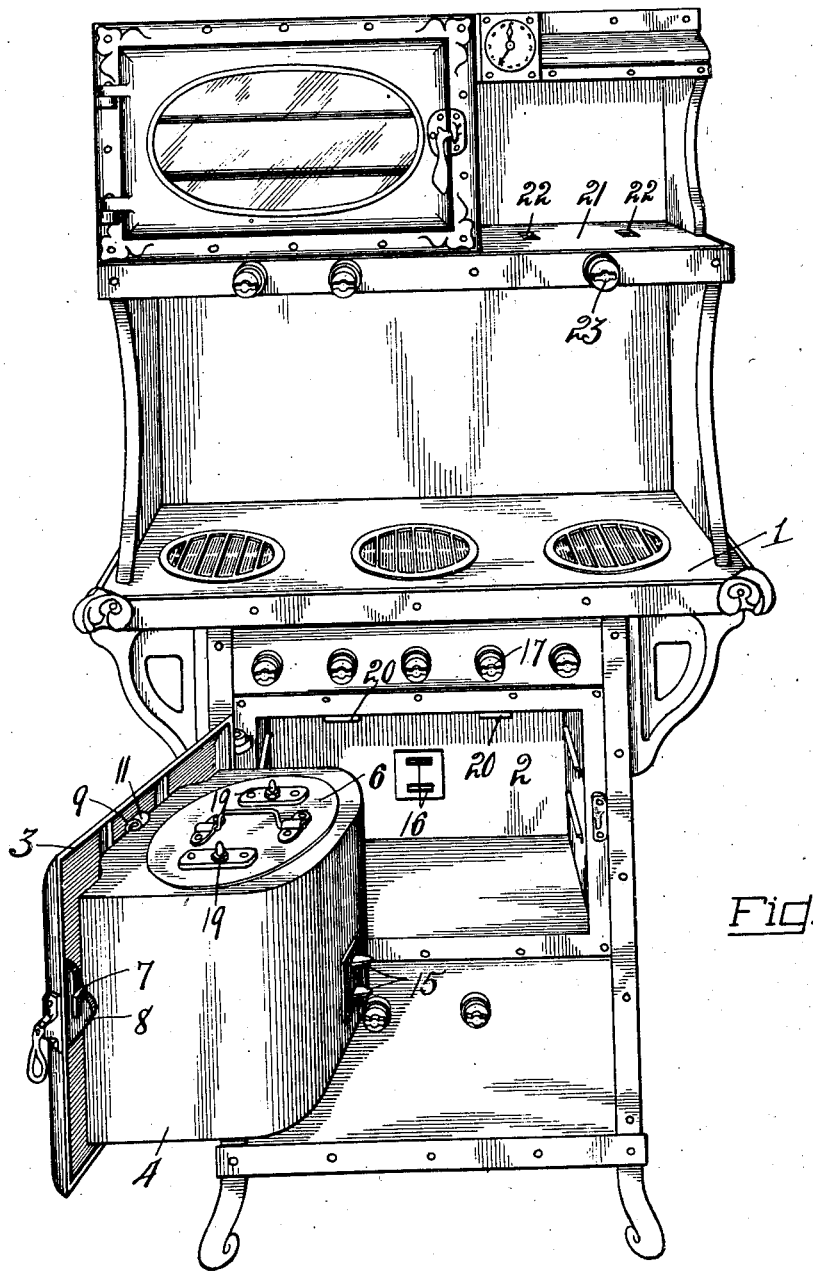
Figure 2:
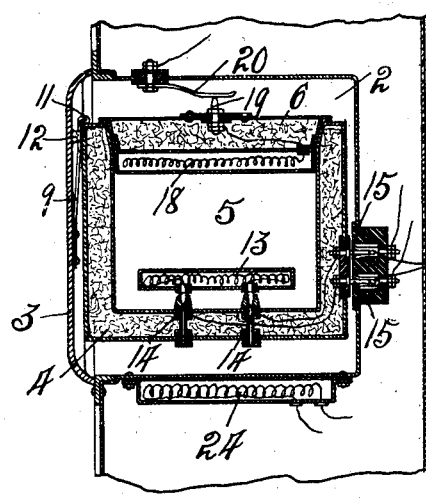
Figure 3:
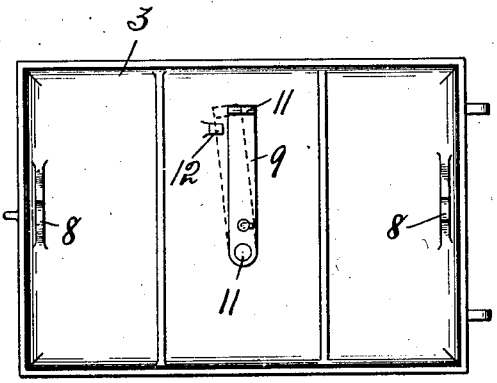
Figure 4:
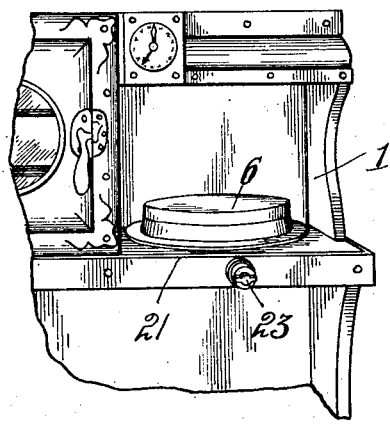

Figure 1 is a front perspective view of a range embodying the invention with the oven door, which carries the cooker in open position. Fig. 2 is a fragmentary section of the range through the oven and cooker with the latter in inclosed position within the oven. Fig. 3 is an inner side elevation of the oven door, and Fig. 4 is a fragmentary view of the range showing the top heating element of the cooker in use as a heating element on the range shelf.

Referring to the drawings, 1 designates a range, which, in the present instance, is of the electric type and which is provided in its base portion with an oven chamber 2 that is closed by a swinging door 3. Removably mounted on the inner side of the door 3 is a cooker 4, which forms an interior cooking chamber 5 which is preferably provided with a top opening that is closed by a removable lid 6. The walls of the cooking chamber 5 are packed or otherwise suitably formed to insulate them against heat as is customary in fireless cookers. The cooker 4 is provided, in the present instance, at each side thereof adjacent its front edge with a stud 7 that is adapted to rest in a notched bracket 8 on the inner side of the door 3 to removably retain the cooker in engagement with the door. A spring catch-finger 9 is pivoted to the inner side of the door, as at 10, and is provided at its free end with an outwardly projecting nose portion 11 which is adapted to engage over the top front edge of the cooker 4 when in position on the door and to prevent a removal of the cooker from the door. The catch-finger 9 is released from locking engagement with the attachment 4 by having its free end sprung inward, and is retained in such inwardly sprung position by a hooked lug 12 on the door 3, the catch being sprung into engagement with said lug, as indicated in Fig. 3.

The heating compartment 4 of the cooker is preferably provided in its bottom portion with an electric heating element 13, which, in the present instance, has the terminals of its coil projecting from the bottom of the element in the form of legs and fitting into registering electric socket parts 14, 14 provided in the bottom of the cooker chamber. The sockets 14, 14 have electrical connection with respective electric plug terminals or posts 15, 15 which project from the rear side of the cooker and are insulatingly carried thereby. A pair of electric sockets 16 are insulatingly carried by the rear wall of the oven 2 in position for the terminals 15 to enter the respective sockets when the cooker 4 is inclosed within the oven, as shown in Fig. 2. The sockets 16 are suitably connected to a source of electric current supply and have a switch disposed in circuit therewith to permit an opening or closing of the electric circuit, as desired. The switch may be one of the switches 17 shown on the front of the range.

The cooker is also shown as being provided in the cover or lid 6 thereof with an electric heating element 18, which element has the two terminal posts 19, 19 projecting in exposed position without the top of the cover. When the cooker is in inclosed position within the oven 2 the terminal posts 19, 19 are intended to make contact with respective spring terminal fingers 20, which are carried at the top of the oven interiorly thereof and are disposed in a common electric circuit, which may be controlled by one of the switches 16.

It is evident from the above that when the oven door 3 is in closed position and has the cooker 4 mounted thereon, both the heating elements 13 and 18 of the cooker will be in circuit with respective switches and the current may be turned into either or both of said elements as may be desired to heat the cooker compartments. It will, of course, be understood that when any articles within the cooker have been heated to a desired or predetermined extent the current may be cut off from the heating elements 13 and 18 and the cooking continued by reason of the retained heat within the cooker, as is well understood in the art.

The cover or lid 6, when not being used in connection with the cooker, may be used as a hot plate or heating element on the range, the range for such purpose having the shelf 21 thereof provided with electric sockets 22, 22 in suitable spaced relation for receiving and making electrical connection with the terminal posts 19, 19 of the cover when the cover is placed in inverted position over the portion of the shelf 21 in which the sockets 22 are disposed. When in such position the heating coil of the heating element 18 within the cover is in circuit with and controlled by a switch 23.

It is evident that when desired, the cooker 4 may be removed from the door 3 to permit the oven 2 to be used for cooking or heating purposes. An electric heating element 24 is provided at the bottom of the oven 2 for heating the same, or it may be heated in any other suitable manner, as is well understood in the range or cooking stove art.

While I have herein shown and described one specific embodiment of my invention for illustrative purposes, and have disclosed and discussed in detail the construction and arrangement incidental to one specific application thereof, it is to be understood that the invention is not limited to the mere detail or relative arrangement of the parts but that deviations from the illustrated form or embodiment of the invention may be made without departing from the spirit of the claims.

Having thus described my invention, what I claim as new, and desire to secure Letters Patent, is—

1. The combination with means forming a compartment and having a door closing one side thereof, of a cooker carried by the door and being inclosed within the compartment when the door is closed, an electric heating element in said cooker, and means automatically operable to place said element in an electric circuit when the cooker is moved into the compartment by a closing of said door.

2. The combination with means forming a compartment having an opening in a side thereof and a door closing said opening, of a cooker carried by said door and movable into the compartment when the door is closed, separate heating elements in said cooker having exposed terminals without the cooker, and means for coacting with said terminals when the cooker is disposed within the compartment whereby to connect the heating elements with a source of electrical supply.

3. The combination with an oven having a door closing a side thereof, of a cooker of the fireless type removably carried by the door for inclosing within the oven when the door is closed, an electric heating element carried by said cooker, and means for automatically placing said element in circuit with a source of electric current supply when the cooker is moved into the oven by a closing of the door.

4. The combination with an oven having a door closing a side thereof, of a cooker carried by said door for inclosing within the oven when the door is closed, a heating element disposed within the cooker and having exposed terminals at one side of the cooker, a second heating element carried by the lid of the cooker and having exposed terminals at the top of the lid, and circuit closing contacts carried by said oven interiorly thereof in position to make contact with the terminals of said heating element when the cooker is inclosed within the oven.

5. In combination, an oven, a door closing a side of said oven and having notched brackets on its inner side, a cooker having studs projecting from its ends and supported by said brackets whereby the cooker is carried by the door, and a spring catch-finger carried by the door and normally engaging the cooker to retain its lugs in engagement with said brackets.

In testimony whereof, I have hereunto signed my name to this specification.

LUTHER D. SMITH.